United States Patent
Zhai et al.

(10) Patent No.: US 11,538,004 B2
(45) Date of Patent: Dec. 27, 2022

(54) SYSTEM AND METHOD FOR FACILITATING ENHANCED OFFLINE PAYMENT

(71) Applicant: ADVANCE NEW TECHNOLOGIES CO., LTD., Grand Cayman (KY)

(72) Inventors: Fen Zhai, Shanghai (CN); Chunlei Gu, Shanghai (CN); Yi Zhang, Shanghai (CN); Xiao Wang, Shanghai (CN); Yingyuan Wang, Shanghai (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 157 days.

(21) Appl. No.: 16/692,607

(22) Filed: Nov. 22, 2019

(65) Prior Publication Data

US 2020/0167742 A1    May 28, 2020

(30) Foreign Application Priority Data

Nov. 23, 2018  (CN) ......................... 201811408106.X (51) Int. Cl.
  *G06Q 20/08*  (2012.01)
  *G06Q 20/14*  (2012.01)
  *G06Q 20/38*  (2012.01)

(52) U.S. Cl.
  CPC ....... *G06Q 20/0855* (2013.01); *G06Q 20/145* (2013.01); *G06Q 20/3829* (2013.01)

(58) Field of Classification Search
  CPC .... G07F 7/125; G07B 15/02; G06Q 2240/00; G06Q 20/3278; G06Q 20/0855; G06Q 20/145; G06Q 20/3829
  See application file for complete search history.

(56) References Cited

U.S. PATENT DOCUMENTS 6,766,956 B1   7/2004  Boylan, III
8,308,056 B2   11/2012  Millan Marco
(Continued)

FOREIGN PATENT DOCUMENTS

CA    2430456 C  * 10/2012  ........... G06Q 20/108
CN    103218137     7/2013
(Continued)

OTHER PUBLICATIONS

Gao et al., "A 2D Barcode-Based Mobile Payment System; 320-329, Jun. 2009", http://www.researchgate.net/profile/Jerry_Gao/publication/221281905_A_2D_Barcode_Based_Mobile_Payment_System/links/54fffc590cf2eaf210bcd49c.pdf, entire document.
(Continued)

*Primary Examiner* — Johann Y Choo
(74) *Attorney, Agent, or Firm* — Seed IP Law Group LLP (57) ABSTRACT

Embodiments described herein provide a client system for facilitating enhanced offline payment. During operation, the system obtains a location indicator, which indicates the location of a service, from a charging system. The system then generates an offline code that allows access to the service and corresponds to the location indicator. The offline code can be readable by the charging system, and the client system and the charging system can both be offline. Subsequently, the system encodes the historical data associated with the service in a field of the offline code and sends a message comprising the offline code to the charging system.

20 Claims, 11 Drawing Sheets

(56) References Cited

U.S. PATENT DOCUMENTS

| | | | |
|---|---|---|---|
| 8,670,976 | B2 | 3/2014 | Al-Omari |
| 8,725,490 | B2 | 5/2014 | Athsani |
| 8,817,959 | B1 | 8/2014 | O'Hanlon |
| 2002/0026475 | A1 | 2/2002 | Marmor |
| 2004/0078282 | A1 | 4/2004 | Robinson |
| 2004/0210841 | A1 | 10/2004 | Takahashi |
| 2005/0138124 | A1 | 6/2005 | Klassen |
| 2006/0065733 | A1 | 3/2006 | Lee |
| 2007/0043682 | A1* | 2/2007 | Drapkin ............ G06Q 20/3829 705/71 |
| 2010/0159965 | A1 | 6/2010 | Pascal |
| 2010/0272193 | A1 | 10/2010 | Khan |
| 2011/0270751 | A1 | 11/2011 | Csinger |
| 2012/0118976 | A1 | 5/2012 | Debski |
| 2012/0271725 | A1 | 10/2012 | Cheng |
| 2013/0179352 | A1* | 2/2013 | Dwyre ................ G06Q 20/38 |
| 2013/0144674 | A1 | 6/2013 | Kim |
| 2013/0275245 | A1* | 10/2013 | Dixon ................ G06Q 20/341 705/21 |
| 2013/0282360 | A1 | 10/2013 | Shimota |
| 2014/0006198 | A1 | 1/2014 | Daly |
| 2014/0195218 | A1 | 7/2014 | Takaoka |
| 2015/0052064 | A1* | 2/2015 | Karpenko ............ G06Q 20/401 705/71 |
| 2015/0269565 | A1 | 9/2015 | Inotay |
| 2015/0358787 | A1 | 12/2015 | Huang |
| 2016/0351200 | A1* | 12/2016 | Sung .................... G10L 15/22 |
| 2018/0068293 | A1* | 3/2018 | Dunne ............... G06Q 20/3223 |
| 2019/0156330 | A1* | 5/2019 | Altenhofen .......... G06Q 20/352 |
| 2019/0279326 | A1* | 9/2019 | Chen .................... G07B 11/00 |

FOREIGN PATENT DOCUMENTS

| | | | |
|---|---|---|---|
| EP | 2782060 | 9/2014 | |
| GB | 2283850 | 5/1995 | |
| JP | 2009098974 | 5/2009 | |
| KR | 20100053707 | 5/2010 | |
| WO | 2008064909 | 6/2008 | |
| WO | 2010135263 | 11/2010 | |
| WO | 2014001937 | 1/2014 | |
| WO | WO-2015103886 A1 * | 7/2015 | ............ H04W 12/04 |

OTHER PUBLICATIONS

Rouillard. "Contextual QR Codes", 50-55, Jul. 2008, http://www.lifl.fr/-rouillar/publi/2008_Rouillard_ICCGI.pdf, entire document.

Carzaniga et al., "Designing Distributed Applications With Mobile Code Paradigms", 22-32, May 1997, http://sei.pku.edu.cn/-yaoguo/PhDReading07/carzaniga-icse19.pdf, entire document.

Johnston et al., "Electronic Data Interchange Using Two Dimensional Bar Code", 83-91, Jan. 1998, http://www.computer.org/csdl/proceedings/hicss/1998/8242/04/82420083.pdf.

Ibrahim et al., "Steganography Algorithm to Hide Secret Message Inside an Image", 102-108, Dec. 2011, http://arxiv.org/pdf/1112.2809.

Anonymous, "EnvoyWorldWide Unveils Intelligent and Interactive Messaging Capabilities at DEMO 2001," Business Wire, Feb. 2001.

* cited by examiner

SYSTEM AND METHOD FOR FACILITATING ENHANCED OFFLINE PAYMENT

RELATED APPLICATION

Under 35 U.S.C. 119, this application claims the benefit and right of priority of Chinese Patent Application No. 201811408106.X, filed 23 Nov. 2018.

BACKGROUND

Field

This disclosure is generally related to the field of data management. More specifically, this disclosure is related to a system and method for facilitating an offline payment based on an offline boarding code in a mode of public transport.

Related Art

The proliferation of the Internet and e-commerce continues to create a vast amount of digital content. Current user devices, such as cell phones, have been created to access and store such digital content. A user device is designed for handling a varying degree of content management scenarios. For example, with the continuous development of mobile payment technologies, a user device can be equipped with a code generation mechanism that can generate a code that facilitates mobile payment. This allows a user to use a boarding code to pay a travel fare (e.g., for using public transports).

An offline boarding code (or an offline code) can be a type of code that allows the user device to pay the fare without a connection to a network (i.e., while being offline). Typically, the user device can provide the offline code to a charging device (e.g., a point of sale (POS) system) in a vehicle. Since the offline boarding code is provided in an offline environment, the charging device records the corresponding payment amount as "a billing amount." The charging device, when connected to a network, settles all recorded bills. Such settlements can be executed periodically or when the charging device moves into a certain location (e.g., a depot). Consequently, even though a user may provide payment information while traveling, the actual transactions are not completed in real-time.

Even though offline codes have brought many desirable features to the charging mechanism of a transportation system, many problems remain unsolved in incorporating transfers and corresponding discounts for offline payment.

SUMMARY

Embodiments described herein provide a client system for facilitating enhanced offline payment. During operation, the system obtains a location indicator, which indicates the location of a service, from a charging system. The system then generates an offline code that allows access to the service and corresponds to the location indicator. The offline code can be readable by the charging system, and the client system and the charging system can both be offline. Subsequently, the system encodes the historical data associated with the service in a field of the offline code and sends a message comprising the offline code to the charging system.

In a variation on this embodiment, the service is a ride on a transport, and the offline code indicates a fare.

In a further variation, the historical data indicates a travel history of a journey, and wherein the ride indicates a phase of the journey.

In a variation on this embodiment, the system determines whether the client system is capable of generating the offline code corresponding to the location indicator. If the system is incapable, the system can obtain a mechanism for generating the offline code corresponding to the location indicator.

In a variation on this embodiment, the system stores the code data in a local storage device. The code data can include a mechanism for generating the offline code and a key associated with the charging device.

In a further variation, the system sends the message by determining whether the key is valid and, if the key is valid, encrypting the offline code with the valid key and including the encrypted offline code in the message.

In a further variation, if the key is invalid, the system can obtain a new key from a key management server.

In a variation on this embodiment, the system operates based on host card emulation (HCE).

In a variation on this embodiment, the message is based on a short-range communication protocol that does not require scanning the offline code.

In a variation on this embodiment, the system receives updated historical data from the charging system and stores the updated historical data in a local storage device.

Embodiments described herein provide a charging system for facilitating enhanced offline payment. During operation, the system sends a location indicator to a client system, wherein the location indicator indicates the location of a service. The system then obtains an offline code that allows access to the service and corresponds to the location indicator. The offline code can be readable by the system, and the client system and the charging system can both be offline. Subsequently, the system obtains historical data associated with the service from a field of the offline code and determines a charging amount for the service based on the historical data. The system can then sends a message comprising an acknowledgment for the offline code to the client system.

In a variation on this embodiment, the service is a ride on a transport, and the offline code indicates a fare.

In a further variation, the historical data indicates a travel history of a journey, and wherein the ride indicates a phase of the journey.

In a variation on this embodiment, to determine the charging amount, the system determines a fare based on the offline code and a discount amount based on the historical data. The system can then determiners the charging amount by deducting the discount amount from the fare.

In a variation on this embodiment, the system obtains the offline code by obtaining encrypted data from a notification message and decrypting the encrypted data based on a key associated with the system.

In a variation on this embodiment, the system determines the validity of the offline code based on the location indicator. If the offline code is valid, the system grants access to the service.

In a variation on this embodiment, the system stores the charging amount as a bill and asynchronously resolves the bill with a billing server.

In a variation on this embodiment, the system operates on a point of sale (POS) system.

In a variation on this embodiment, the message is based on a short-range communication protocol that does not require scanning the offline code.

In a variation on this embodiment, the system updates the travel data to incorporate the access to the service and sends the updated travel data to the client system.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of incorporating transfer information in an offline payment system by (i) locally storing code generation data in a user device that allows the generation of an offline boarding code; and (ii) incorporating travel information into the offline boarding code, thereby allowing a charging device to calculate a transfer discount and update travel information for the user device. In this way, the user device can receive the discount and use the updated travel information for any subsequent phase, if any, of the journey to receive a corresponding transfer discount.

Public transports, such as buses and subways, are commonly used by people for travel, and the payments for using public transports have the characteristics of a small charging amount with high frequency. A user can use a user device to obtain an offline code (e.g., a two-dimensional code, such as a Quick Response (QR) code) to board a public transport vehicle and provide the corresponding payment. With existing technologies, the user device can generate an offline boarding code and present the offline code to a charging device on a mode of public transport. The charging device can record the information provided by the offline code, calculates a charging amount for the user, and generate a corresponding bill. When the charging device connects to a network, the charging device can resolve the bill with a payment server.

If the user is eligible for a discount (e.g., a senior discount, a volume or package discount, or a discount for using a particular payment service), the offline code can incorporate the discount information. The charging device can use the discount information to provide a discount while calculating the charging amount. However, such discounts can be limited to a single phase of the journey. For example, if the user transfers from the subway to a bus, the user may receive a transfer discount and is eligible for a reduced or eliminated fare for the ride. If the user device remains offline, the user device may not be able to incorporate the transfer discount information for the subsequent phase of the journey.

To solve this problem, embodiments described herein provide an enhanced offline payment system that can incorporate transfer information into an offline code. During operation, the user can initiate a client system that facilitates the operations of the enhanced offline payment system in the user device. In some embodiments, the client system can operate based on host card emulation (HCE). The user may specify a journey (e.g., a source, a destination, and transport preferences) to the client system, which in turn, obtains a mechanism for generating an offline boarding code, such as an offline boarding code generation algorithm. The client system can establish a connection with a code management server that provides code data to the client system. The server can validate the client system (e.g., using a password, a certificate, or a combination thereof).

Upon successful validation, the server can provide code data to the client system. The code data can include one or more of: an offline boarding code generation algorithm, a key, a key validity period, and associated data. The client system can receive the code data and store the code data in a local storage device. The client system can also store the travel history associated with the journey. At the beginning of the journey, the travel history can be empty. The travel history of a respective phase of the journey can include one or more of: a transport type, a charging device identifier, and a boarding time.

When the user boards a vehicle as a part of the journey, the user device can establish a communication channel with a charging device (e.g., a POS system) of the vehicle using a short-range communication protocol. The user device can receive a connection request from the charging device and establish the connection based on the parameters indicated by the request. Examples of the short-range communication protocol include, but are not limited to, Bluetooth, infrared, wireless local area network (WLAN), WiFi direct, ultra-broadband, Zigbee, and near field communication (NFC). It should be noted that HCE typically establishes connection using NFC. The charging device and the user device can be equipped with respective NFC modules and facilitate NFC communication.

The client system may receive a charging request via the channel from a charging system of the charging device. The charging request can include a city code that indicates the location of the current ride (e.g., the area where the current phase of the journey is taking place) and the fare information. Since the client system may operate on multiple phases of the journey and the charging system may operate only with the current phase, the city code allows the client system to generate an offline code that is supported by the charging system. Upon receiving the charging request, the client system generates an offline code based on the city code using the offline boarding code generation algorithm. If the algorithm does not support the current city, the client system may obtain the code data associated with the city code form the code management server.

The client system provides the offline code and the local travel history to the charging system. In some embodiments, the algorithm can encode information associated with the local travel history into the offline code. For example, the client system can determine a fare discount (or an offset) associated with the travel history and represent the discount in a discount indicator (e.g., a code indicating a discount amount). The algorithm can then encode the discount indicator in a field of the offline code. The client system may provide the offline code and the information associated with the local travel history as separate pieces of data via one or more messages (e.g., data packets). In an embodiment, the client system may encrypt the offline code and the local travel history based on the key, and provide the encrypted information to the charging system.

Upon receiving the encrypted information, the charging system decrypts the encrypted information to retrieve the offline code and the local travel history. The charging system then verifies the offline code and determines the current fare associated with the current phase of the journey based on the offline code. The charging system may also determine a discount, if applicable, from the local travel history. For example, if the local travel history indicates a transfer, the charging system may apply a transfer discount to the fare. The charging system can incorporate the current travel information into the local travel history and send the updated travel history to the client system. Subsequently, the client system can maintain the updated travel history as the local travel history (e.g., by replacing the existing history). The charging system can calculate the fare based on the discounts and asynchronously request the payment server to deduct the fare.

Exemplary System

Figure 1A:
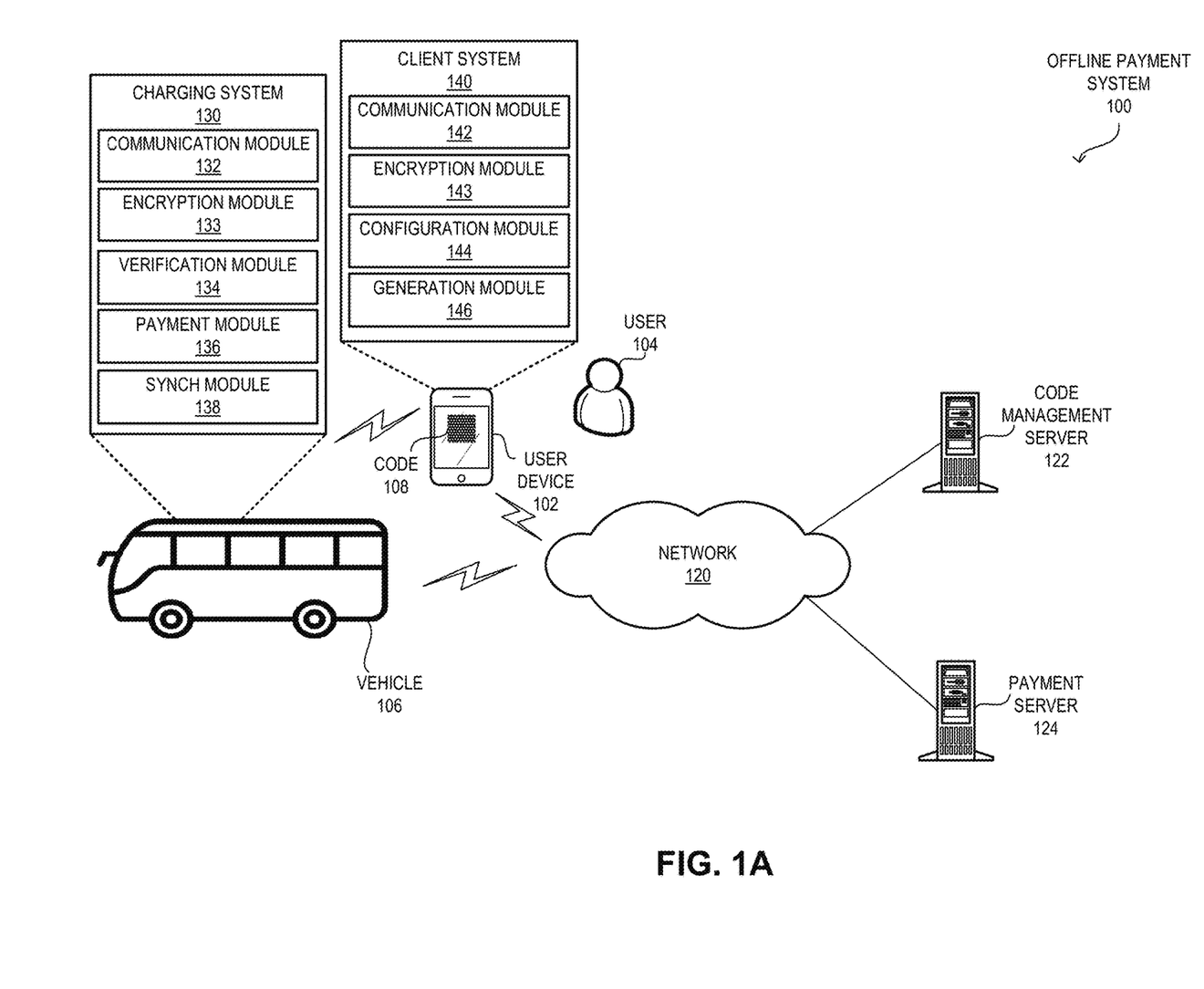
FIG. 1A illustrates an exemplary offline payment environment facilitating an enhanced offline payment on a vehicle, in accordance with an embodiment of the present application.

FIG. 1A illustrates an exemplary offline payment environment facilitating an enhanced offline payment on a vehicle, in accordance with an embodiment of the present application. To access a public transport vehicle 106, such as a bus or a subway car, and pay for the ride, a user 104 can use a user device 102 to obtain an offline code. The offline code can be a code that can be scanned by a charging device 150. Examples of the offline code can include a QR code and a barcode. With existing technologies, charging device 150 can record the information provided by the offline code, calculates a charging amount for user 104, and generate a corresponding bill. When charging device 150 connects to a network 120, charging device 150 can resolve the bill with a payment server 124. Network 120 can be a local or a wide area network and can facilitate Internet access to user device 102 and/or charging device 150.

If user 104 is eligible for a discount, the offline code can incorporate the discount information. Charging device 150 can use the discount information to provide a discount while calculating the charging amount. For example, charging device 150 can deduct the discount amount from the fare to determine the charging amount. However, such a discount can be limited to a single phase of the journey. If user 104 transfers from another vehicle to vehicle 106, user 104 may receive a transfer discount and is eligible for a reduced or eliminated fare for a ride on vehicle 106. If user device 102 remains offline, user device 102 may not be able to incorporate the transfer discount information in the offline code.

To solve this problem, an enhanced offline payment system 100 can locally store code generation data in user device 102 that allows the generation of offline code 108. System 100 can then incorporate the travel information associated with user 104 into code 108, thereby allowing charging device 150 to calculate a transfer discount and update travel information for user device 102. System 100 can include a charging system 130 and a client system 140 that facilitate the operations of system 100 in charging device 150 and user device 102, respectively. Charging system 130 can include a communication module 132, a verification module 134, a payment module 136, and a synchronization (or synch) module 138. Client system 140 can include a communication module 142, a configuration module 144, and a generation module 146. Each of communication modules 132 and 142 can support a number of communication techniques, such as short-range wireless communication and packet-based communication (e.g., based on Ethernet and Internet Protocol (IP)).

During operation, user 104 can initiate client system 140 and specify a journey to system 140. Configuration module 144 then requests code data from a code management server 122 via network 120. To obtain the code data, system 140 can establish a connection with server 122 using communication module 142. Server 122 can validate system 140 (e.g., using a password, a certificate, or a combination thereof). Upon successful validation, server 122 can provide the code data to system 140. The code data can include one or more of: an offline boarding code generation algorithm, a key, a key validity period, and associated data. System 140 can receive the code data and store the code data in a local storage device (e.g., the internal storage or a memory card) of user device 102. System 140 can also store the travel history associated with the journey. At the beginning of the journey, the travel history can be empty. The travel history of a respective phase of the journey can include one or more of: a transport type, a charging device identifier, and a boarding time.

When user 104 boards vehicle 106, communication modules 132 and 142 can establish a short-range wireless connection among them. Client system 140 may receive a charging request via communication module 142 from charging system 130. The charging request can include a city code that indicates the location of the current ride and an amount representing the fare. Since client system 140 may operate on multiple phases of the journey and charging system 130 may operate only with the current phase, the city code allows client system 140 to generate an offline code that is supported by the charging system 130.

Upon receiving the charging request, generation module 146 generates an offline code 108 based on the city code using the algorithm. If the algorithm does not support the current city, configuration module 144 may obtain the code data associated with the city code from code management server 122. Client system 140 provides code 108 and the local travel history to charging system 130 using the short-range wireless connection. In some embodiments, generation module 146 can encode information associated with the local travel history into code 108. For example, client system 140 can determine a fare discount (or an offset) associated with the travel history and represent the discount in a discount indicator. Generation module 146 can then encode the discount indicator in a field of code 108. Client system 140 may also provide code 108 and the information associated with the local travel history as separate pieces of data via one or more messages (e.g., data packets).

In an embodiment, communication between client system 140 and charging system 130 can be encrypted. An encryption module 143 of client system 140 can then encrypt code 108 and the local travel history based on the key. Subsequently, communication module 142 provides the encrypted information to charging system 130 via communication module 132. Upon receiving the encrypted information, encryption module 133 decrypts the encrypted information to retrieve code 108 and the local travel history. Verification module 134 then verifies code 108 and determines the current fare associated with the current phase of the journey based on code 108.

Payment module 136 may also determine a discount, if applicable, from the local travel history. For example, if the local travel history indicates a transfer, payment module 136 may apply a transfer discount to the fare. Payment module 136 can incorporate the current travel information into the local travel history. Communication module 132 sends the updated travel history to client system 140. Subsequently, generation module 146 can maintain the updated travel history as the local travel history (e.g., by replacing the existing history) and can use the updated history for subsequent phases of the journey. On the other hand, payment module 136 can calculate the fare based on the discounts and maintain the corresponding billing information. Synchronization module 138 can asynchronously request payment server 124 to deduct the fare.

Figure 1B:
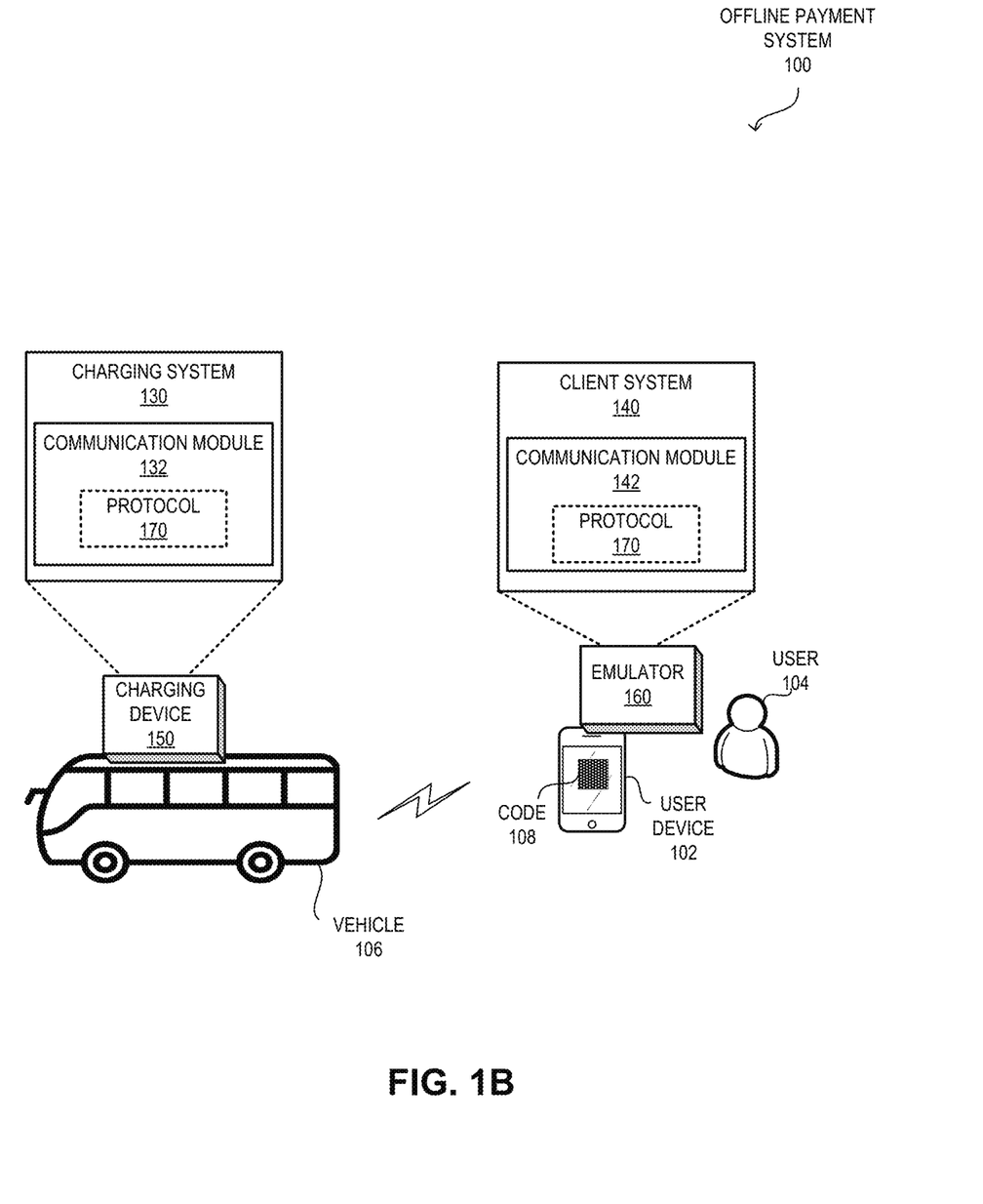
FIG. 1B illustrates an exemplary communication in an offline payment environment for facilitating an enhanced offline payment on a vehicle, in accordance with an embodiment of the present application.

FIG. 1B illustrates an exemplary communication in an offline payment environment for facilitating an enhanced offline payment on a vehicle, in accordance with an embodiment of the present application. Client system 140 can operate based on an emulator 160. In some embodiments, emulator 160 can be implemented based on HCE and code 108 can be an HCE boarding code. Emulator 160 allows user 104 to board vehicle 106 using user device 102 without an online access. Consequently, user 104 does not need to carry a wallet or IC card. To user client system 140, user 104 does not need to unlock user device 102, select an application to generate an offline code, and point the offline code to a code scanner. Instead, user 104 only needs to place user device 102 within a range of communication of charging device 150 to complete the offline payment. Since client system 140 does not need to access a code scanner of charging device 150, the experience of user 104 may improve significantly.

The communication channel between communication modules 132 and 142 can be established based on a short-range communication protocol 170. User device 102 can receive a connection request from charging device 150 and establish the connection based on the parameters indicated by the request. Examples of protocol 170 include, but are not limited to, Bluetooth, infrared, WLAN, WiFi direct, ultra-broadband, Zigbee, and NFC. It should be noted that HCE typically establishes connection using NFC. Communication modules 132 and 142 can be equipped with respective NFC capabilities and facilitate the NFC-based communication channel.

Enhanced Offline Payment

Figure 2:
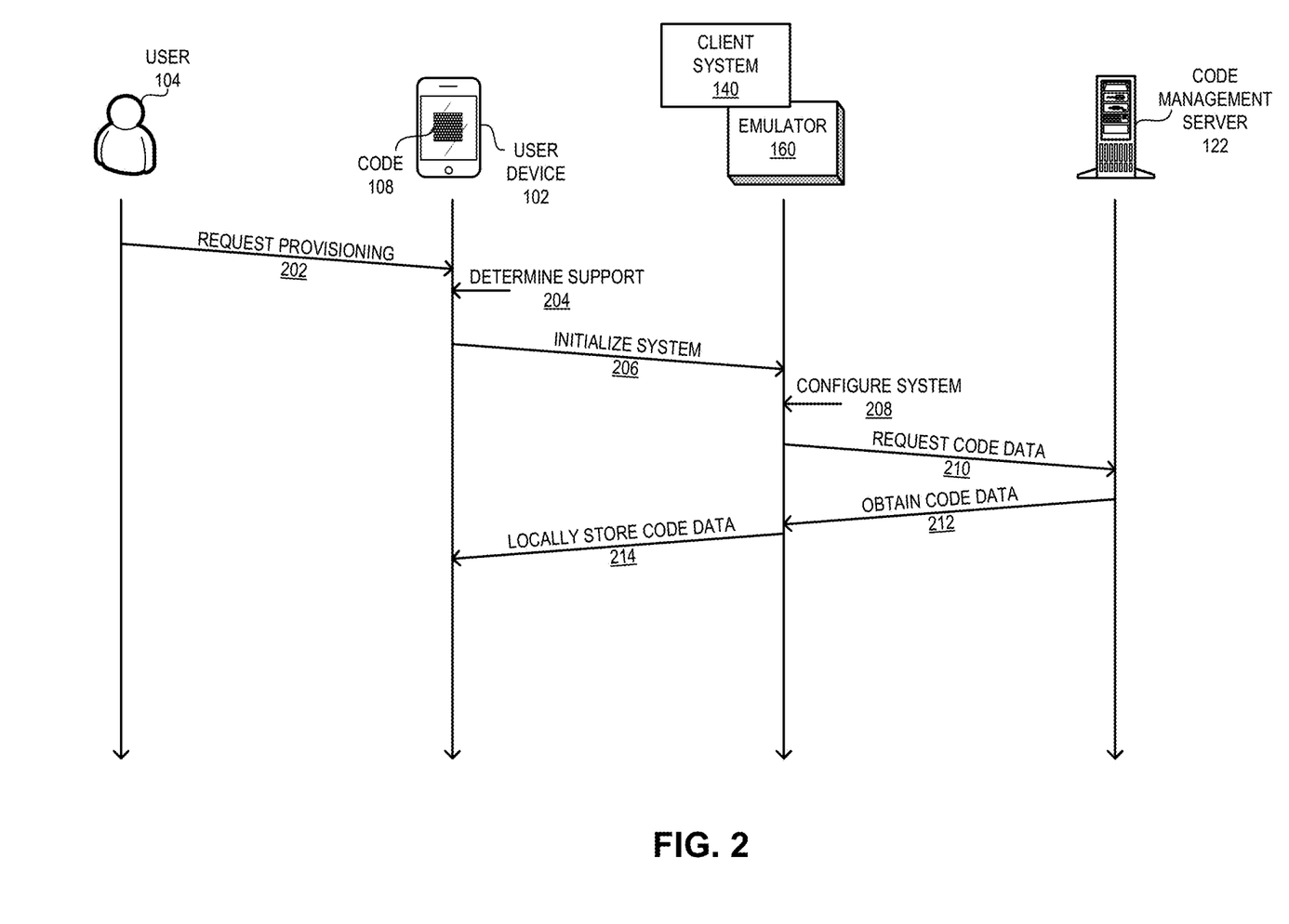
FIG. 2 illustrates an exemplary communication of a user device obtaining code data for facilitating an enhanced offline payment, in accordance with an embodiment of the present application.

FIG. 2 illustrates an exemplary communication of a user device obtaining code data for facilitating an enhanced offline payment, in accordance with an embodiment of the present application. During operation, user 104 can request provisioning on user device 102 (operation 202). User device 102 can determine whether user device 102 supports emulator 160 (operation 204). If user device 102 supports emulator 160, user device 102 can initialize (e.g., launch) client system 140 (operation 206). Client system 140 can configure a code management background (operation 208) and request code data for code management (operation 210). User device 102 then obtains the code data (operation 212). The code data can include code generation data for generating code 108, a key, and a validity period of the key. Subsequently, user device 102 can locally store the code data (operation 214).

Figure 3A:
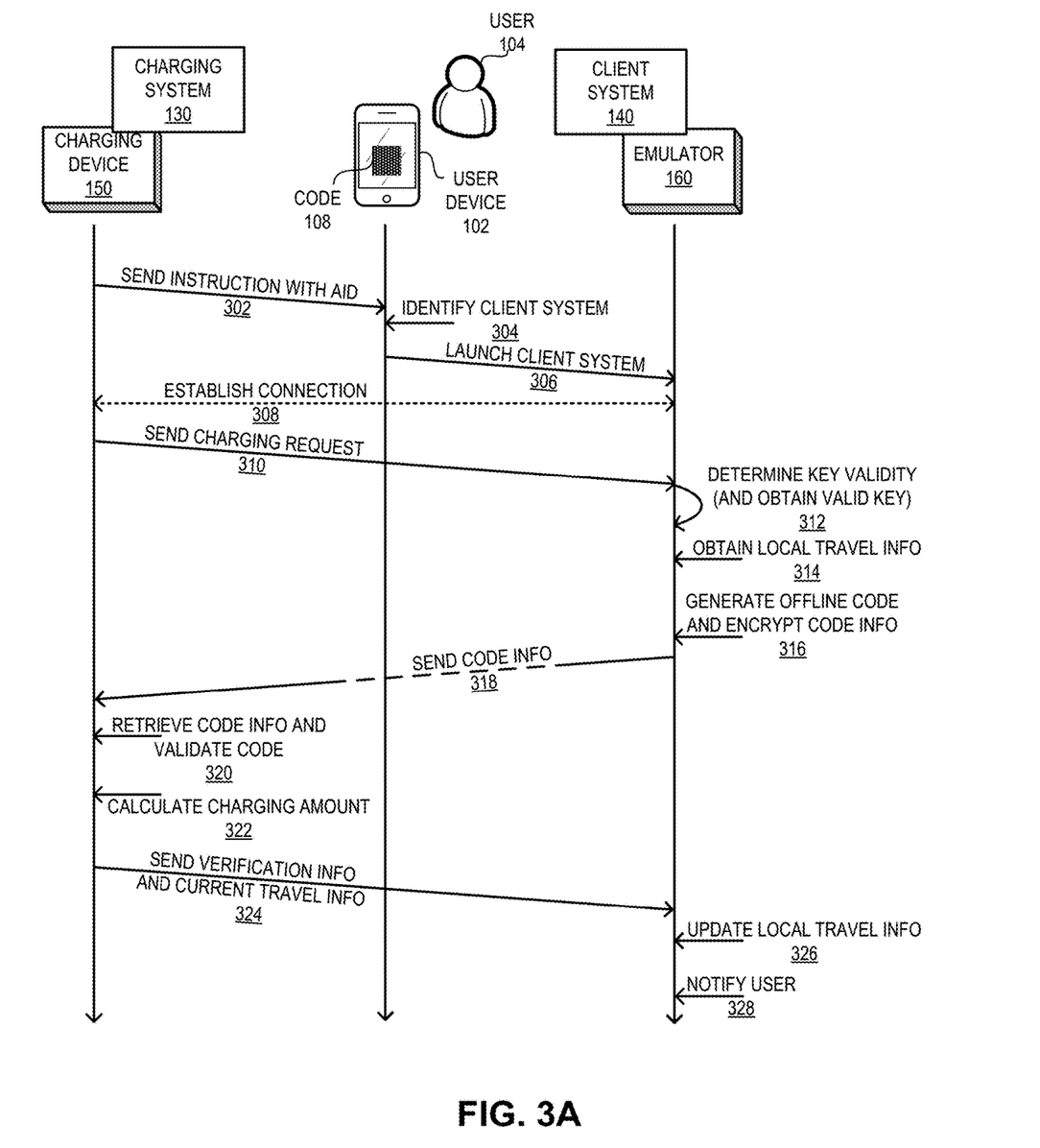
FIG. 3A illustrates an exemplary communication of a charging device facilitating an enhanced offline payment from a user device, in accordance with an embodiment of the present application.

FIG. 3A illustrates an exemplary communication of a charging device facilitating an enhanced offline payment from a user device, in accordance with an embodiment of the present application. During operation, charging system 130 sends an instruction with a smartcard application identifier (AID) (operation 302). Since the instruction is sent based on an AID, upon receiving the instruction, user device 102 can identify client system 140 (operation 304) and launch client system 140 (operation 306). In this way, the instruction may be routed to a specific application. Charging system 130 and client system 140 then establishes an inter-application connection (operation 308). For example, charging system 130 and client system 140 can establish an NFC connection.

Charging system 130 then sends a charging request to user device 102 (operation 310). The charging request can include a city code and the fare information. Upon receiving the charging request, client system 140 can determine the validity of the key (operation 312). Client system 140 may determine whether the validity period of the key has been expired to determine the validity of the key. If the key is not valid, client system 140 can obtain a valid key, as described in conjunction with FIG. 3B. Subsequently, client system 140 obtains the local travel information (operation 314).

Based on the local travel information, client system 140 generates an offline code 108 and encrypts the information associated with the offline code using the valid key (operation 316). The code information can include the local travel information and code 108. The local travel information can be encoded in a field of code 108 as well. Client system 140 then sends the encrypted code information to charging system 130 (operation 318). Since the connection is based on NFC, client system 140 may send the code information via emulator 160 bypassing the networking hierarchy of user device 102 (shown with a dashed line). Charging system 130 can retrieve the code information by decrypting the encrypted code information and validate code 108 (operation 320). For example, charging system 130 can determine whether code 108 corresponds to the city code and/or the fare information. Charging system 130 can then calculate a charging amount by determining whether one or more discounts are applicable based on the code information (operation 322).

If a discount is applicable, charging system 130 can determine the discount amount and subtract the discount amount from the fare to determine the charging amount. In some embodiments, charging system 130 can analyze a set of rules to determine the discount amount. For example, the encrypted code information can carry one or more indicators that can indicate corresponding types of discount. An indicator can include a bit pattern and/or its value. Examples of the types of discount can include, but are not limited to, transfer discounts for the phases of the journey already completed, a senior discount, a volume or package discount, and a discount for using a particular payment service. A rule may map a particular indicator to a corresponding discount amount. In the rules, charging system 130 can look up a respective indicator in the encrypted code information and determine the corresponding discount amount.

Charging system 130 sends the verification information (e.g., an acknowledgement of a successful boarding) and the current travel information to client system 140 (operation 324). Charging system 130 can update the received travel information with the current phase of the journey to generate the current travel information. Client system 140 receives the current travel information and updates the local travel information accordingly (operation 326). Client system 140 then notifies user 104 (e.g., by displaying a message on the screen of user device 102) (operation 328). In this way, charging system 130 and client system 140 can facilitate an offline boarding code that can incorporate discount information without a network access.

Figure 3B:
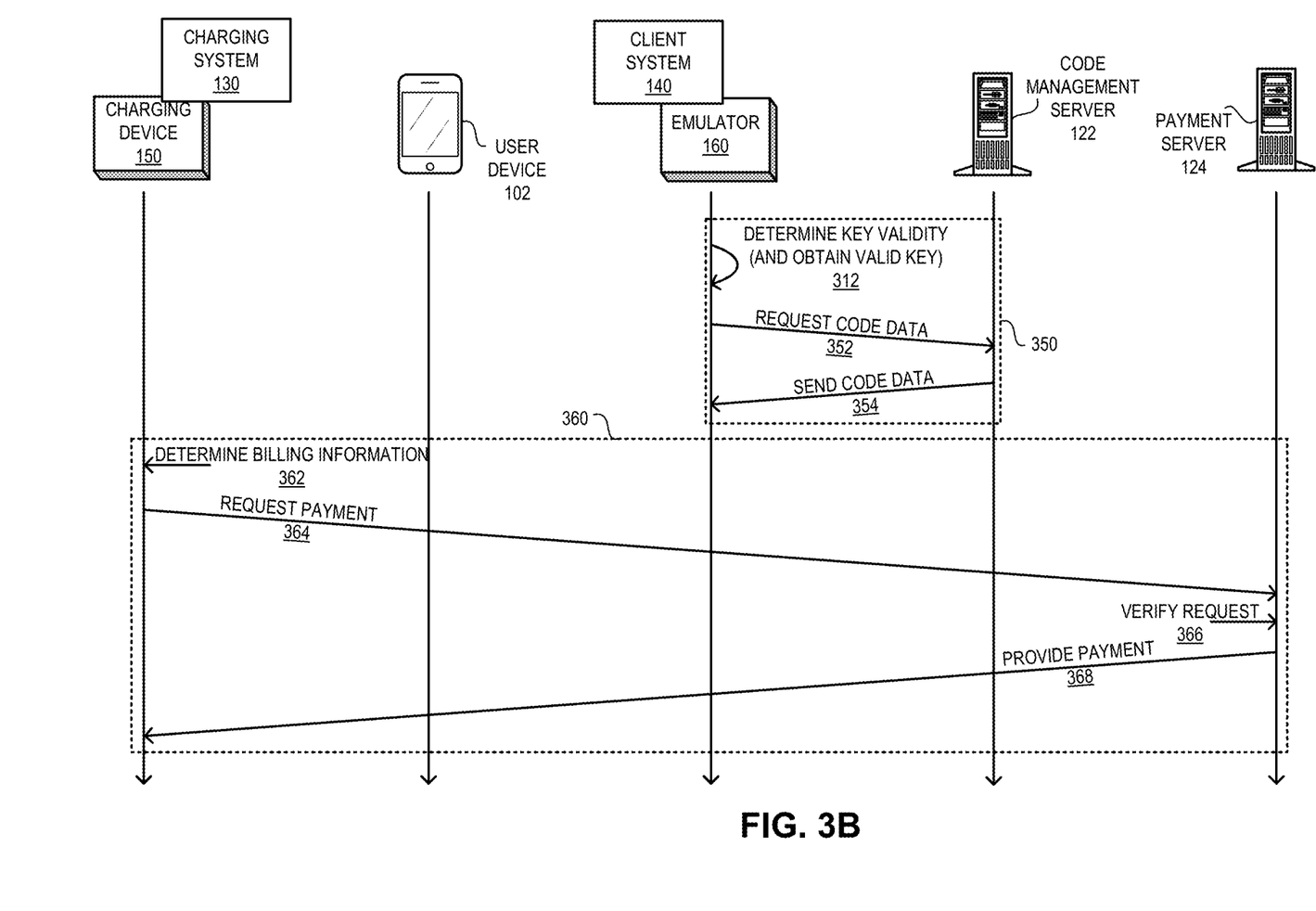
FIG. 3B illustrates exemplary online communications of a charging device and a user device for facilitating an enhanced offline payment, in accordance with an embodiment of the present application.

FIG. 3B illustrates exemplary online communications of a charging device and a user device for facilitating an enhanced offline payment, in accordance with an embodiment of the present application. Such online communications can include a user device obtaining a valid key (communication 350) and a charging device obtaining payment from a payment server (communication 360). Upon receiving the charging request, client system 140 can determine the validity of the key (operation 312). If the key is invalid (e.g., the validity period of the key has been expired), client system 140 needs to re-obtain the key from server 122. As a result, client system 140 may need to establish a network connection (e.g., via a local network or the Internet). Based on the connection, client system 140 requests code data from code management server 122 (operation 352). Based on the request, server 122 can send the code data to client system 140 (operation 354).

On the other hand, since charging device 150 may not be connected to a network, charging system 130 stores a respective charging amount as a bill that can be collected when charging device 150 connects to a network (e.g., becomes online). Upon connecting to a network, charging system 130 can determine the billing information associated with a respective charging amount (operation 362). Based on the billing information, charging system 130 can request the corresponding payment from payment server 124 (operation 364). Charging system 130 can encrypt the payment request and may include verification information can establish legitimacy of the request (e.g., a signature). Server 124 can verify the request (operation 366) and, upon successful verification, provide the payment to charging system 140. Such payment can be an electronic payment, such electronic money transfer to an account associated with charging system 140.

Operations

Figure 4:
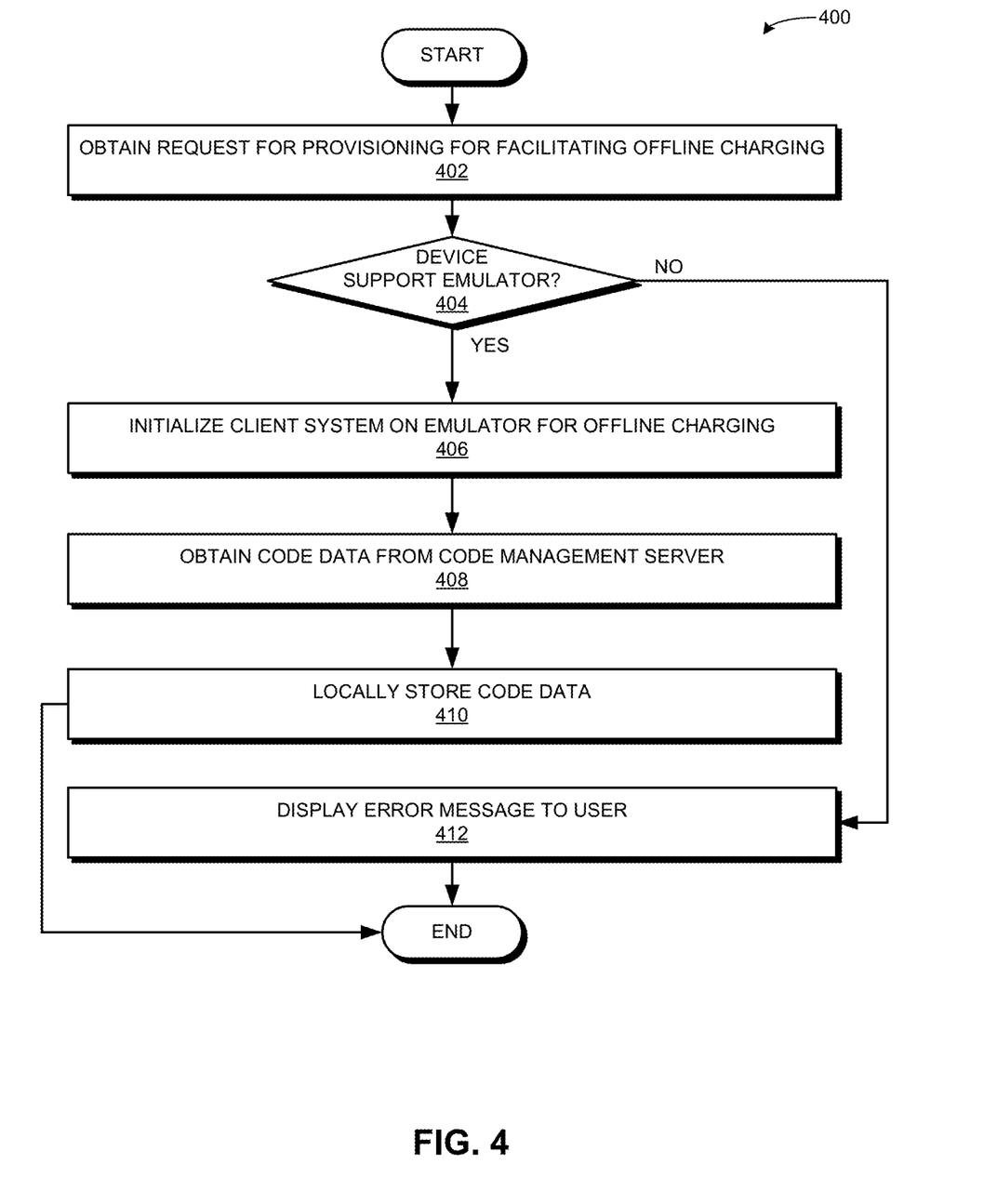
FIG. 4 presents a flowchart illustrating a method of a user device obtaining code data for facilitating an enhanced offline payment, in accordance with an embodiment of the present application.

FIG. 4 presents a flowchart 400 illustrating a method of a user device obtaining code data for facilitating an enhanced offline payment, in accordance with an embodiment of the present application. During operation, the user device can obtain a request for provisioning for facilitating offline charging (operation 402). The user device can then check whether it supports an emulator that can facilitate the operations of a client system (operation 404). If the user device supports the emulator, the user device initializes the client system on the emulator for offline charging (operation 406). The user device, using the client system, obtains code data from a code management server (operation 408) and locally stores the code data (operation 410). On the other hand, if the user device does not support the emulator, the user device may display an error message to the user (operation 412).

Figure 5A:
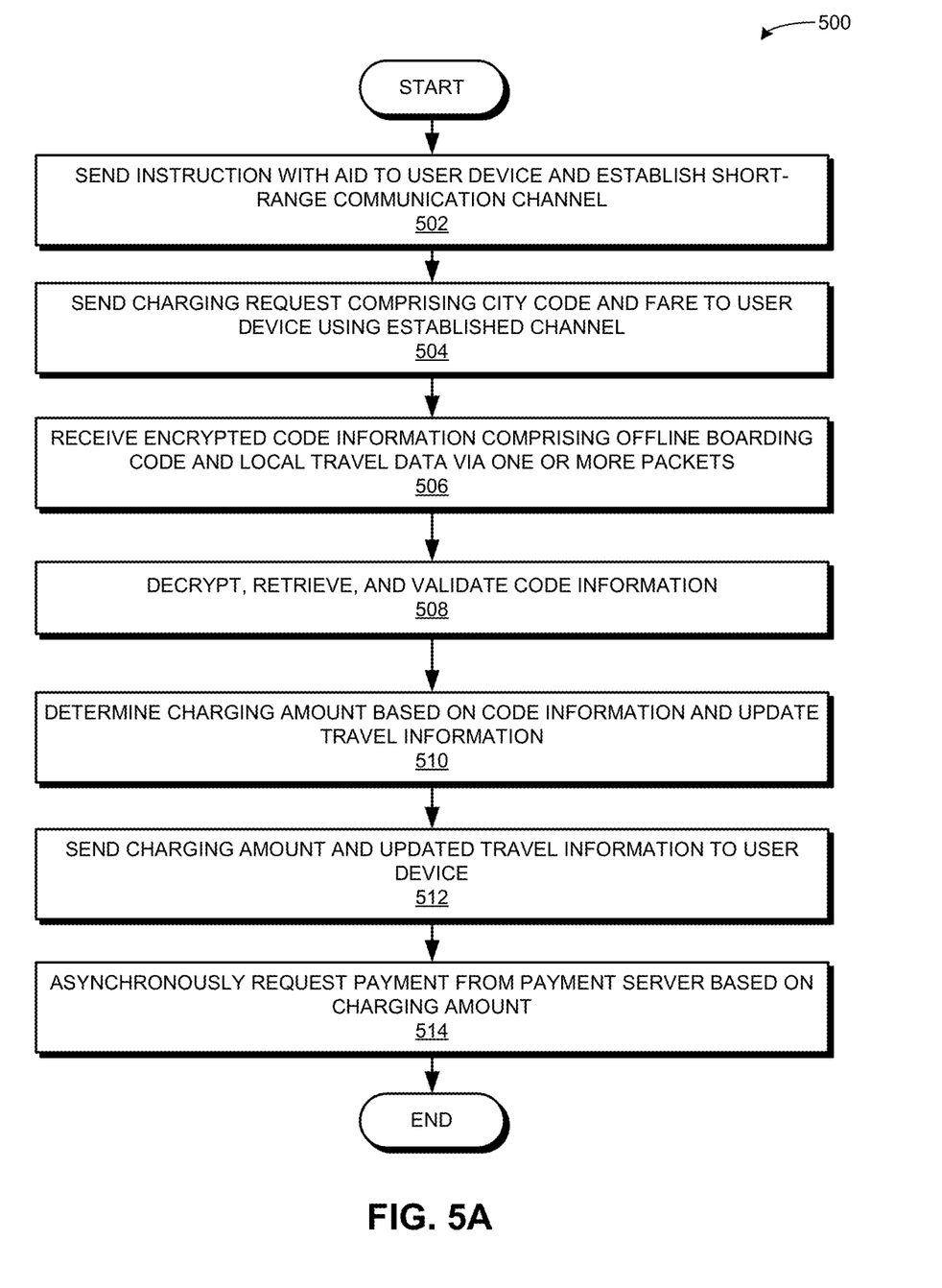
FIG. 5A presents a flowchart illustrating a method of a charging system facilitating an enhanced offline payment, in accordance with an embodiment of the present application.

FIG. 5A presents a flowchart 500 illustrating a method of a charging system facilitating an enhanced offline payment, in accordance with an embodiment of the present application. During operation, the charging system sends an instruction with an AID to a user device and establishes a short-range communication channel with the user device (operation 502). The charging system then sends a charging request comprising a city code and the fare to the user device using the channel (operation 504). In response, the charging system can receive encrypted code information comprising an offline boarding code and the local travel information from the user device via one or more packets (operation 506).

The charging system then decrypts, retrieves, and validates the code information (operation 508). Subsequently, the charging system determines a charging amount based on the code information and updates the travel information (operation 510). For example, the charging system can determine one or more discounts based on the code information and subtract the discounts from the fare to determine the charging amount. Subsequently, the charging system sends the charging amount and the updated travel information to the user device (operation 512). When the charging system can access a network, the charging system can asynchronously request payment from a payment server based on the charging amount (operation 514).

Figure 5B:
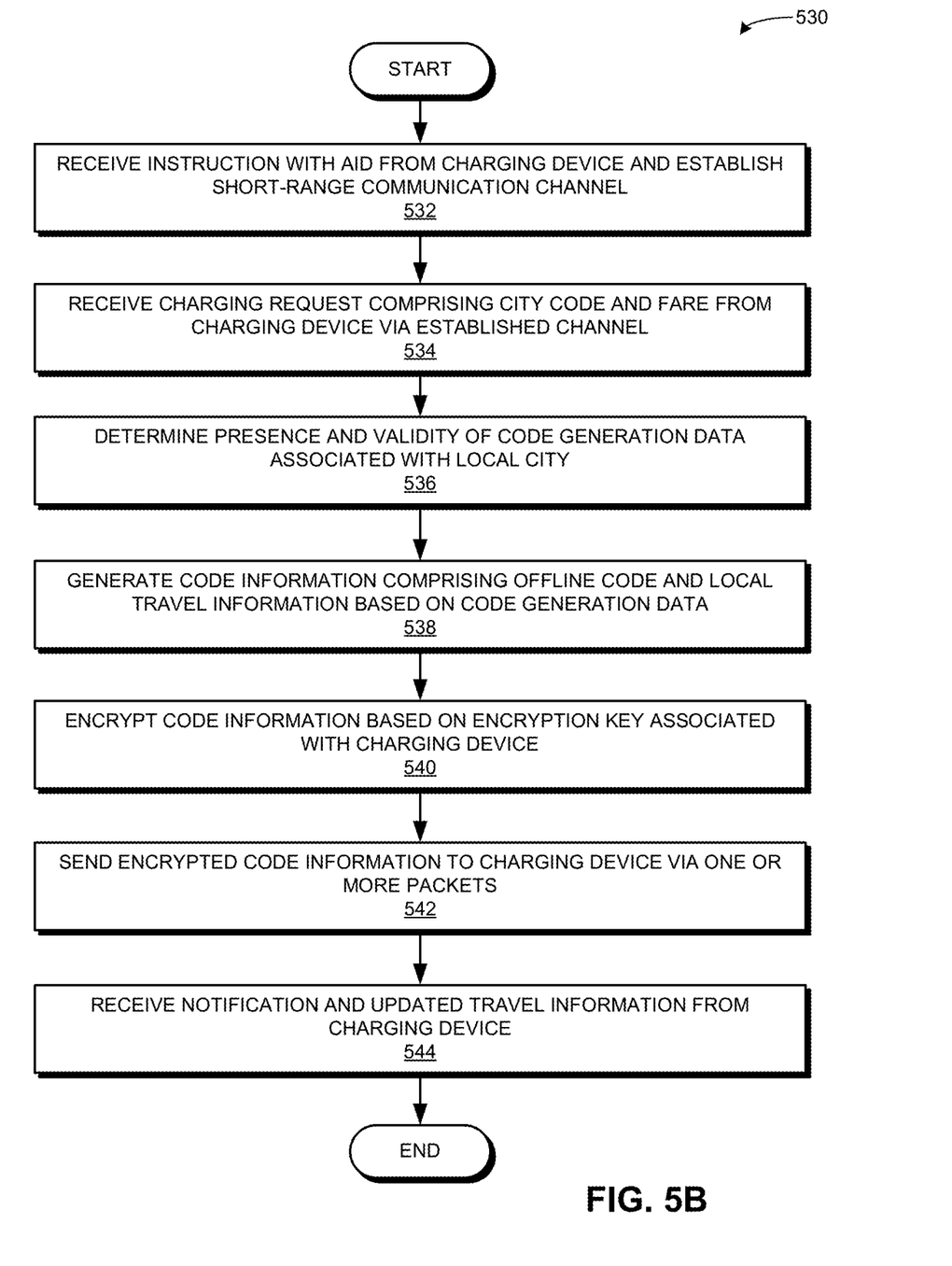
FIG. 5B presents a flowchart illustrating a method of a client system facilitating an enhanced offline payment, in accordance with an embodiment of the present application.

FIG. 5B presents a flowchart 530 illustrating a method of a client system facilitating an enhanced offline payment, in accordance with an embodiment of the present application. During operation, the client system receives an instruction with an AID from a charging system and establishes a short-range communication channel with the charging device hosting the charging system (operation 532). The client system then receives a charging request comprising a city code and the fare from the charging device via the channel (operation 534). Subsequently, the client system determines the presence and validity of code generation data associated with the city code (operation 536).

The client system can generate code information comprising an offline boarding code and the local travel information based on the code generation data (operation 538). The client system then encrypts the code information based on an encryption key associated with the charging device (operation 540). The client system can send the encrypted code information to the charging device via one or more packets (operation 542). Subsequently, the client system receives a notification (e.g., an acknowledgment) and the updated travel information from the charging device (operation 544).

Figure 5C:
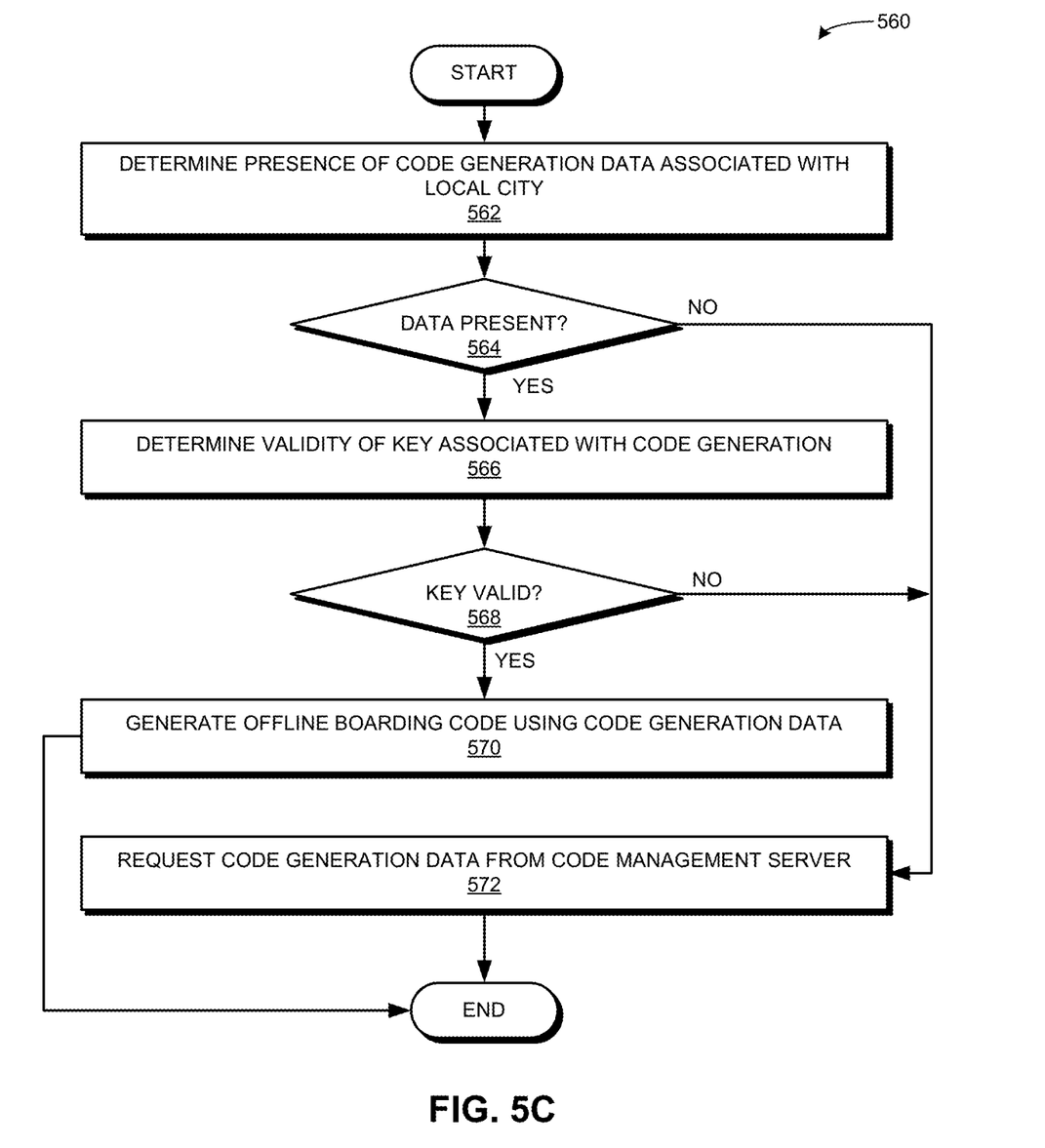
FIG. 5C presents a flowchart illustrating a method of a client system validating code generation data for facilitating an enhanced offline payment, in accordance with an embodiment of the present application.

FIG. 5C presents a flowchart 560 illustrating a method of a client system validating code generation data for facilitating an enhanced offline payment, in accordance with an embodiment of the present application. During operation, the client system determines the presence of the code generation data associated with the local city (operation 562). If the code generation data is present (operation 564), the client system determines the validity of the key associated with the code generation (operation 566). If the key is valid (operation 568), the client system can generate an offline boarding code using the code generation data (operation 570). On the other hand, if the code generation data is not present (operation 564) or the key is valid (operation 568), the client system can request the code generation data from a code management server (operation 572).

Exemplary Computer System and Apparatus

Figure 6:
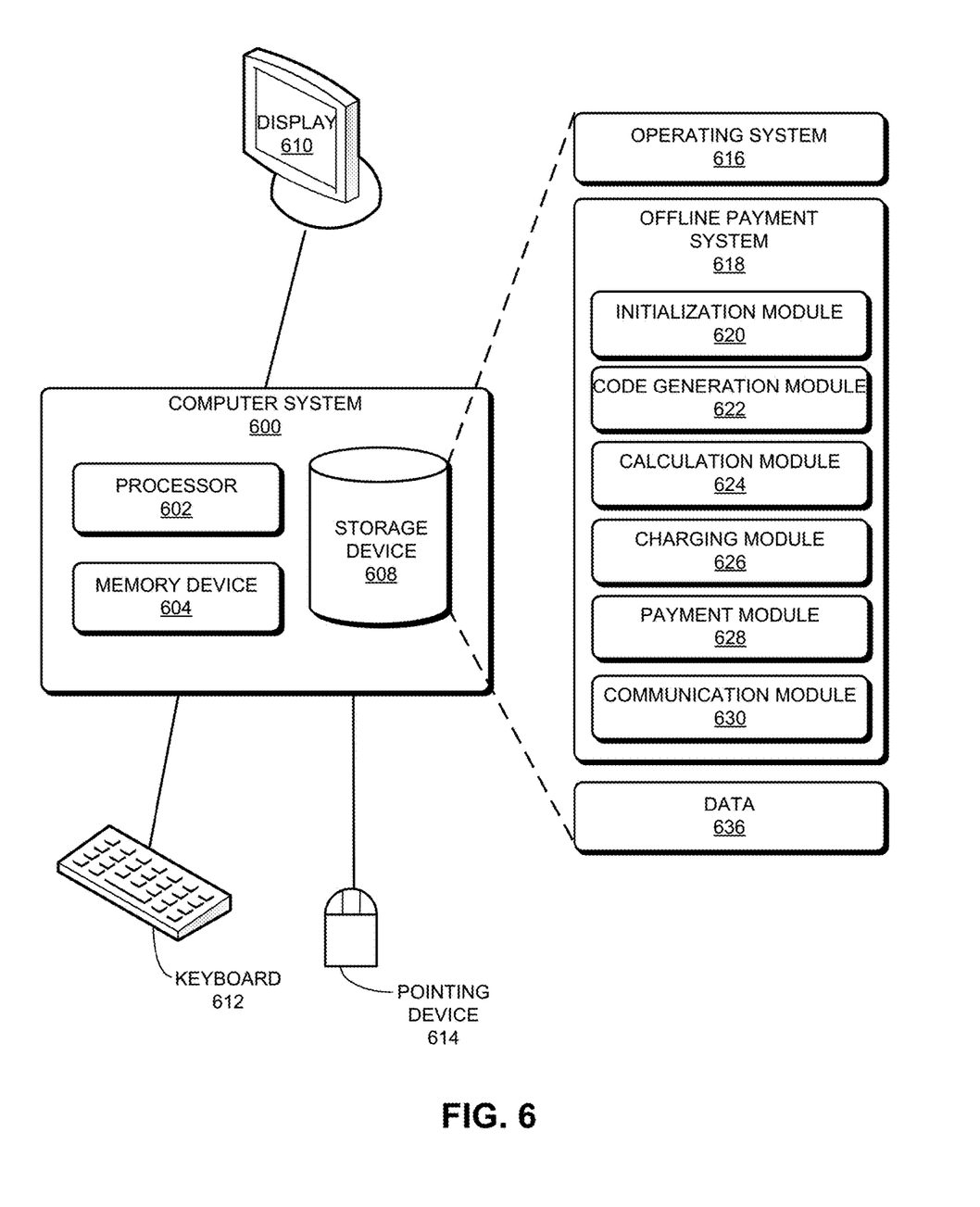
FIG. 6 illustrates an exemplary computer system that facilitates an enhanced offline payment, in accordance with an embodiment of the present application.

FIG. 6 illustrates an exemplary computer system that facilitates an enhanced offline payment, in accordance with an embodiment of the present application. Computer system 600 includes a processor 602, a memory device 604, and a storage device 608. Memory device 604 can include volatile memory (e.g., a dual in-line memory module (DIMM)). Furthermore, computer system 600 can be coupled to a display device 610, a keyboard 612, and a pointing device 614. Storage device 608 can be a hard disk drive (HDD) or a solid-state drive (SSD). Storage device 608 can store an operating system 616, an offline payment system 618, and data 636. Offline payment system 618 can facilitate the operations of charging system 130 and client system 140.

Offline payment system 618 can include instructions, which when executed by computer system 600 can cause computer system 600 to perform methods and/or processes described in this disclosure. Specifically, offline payment system 618 can include instructions for obtaining code data and locally storing the obtained code data (initialization module 620). Offline payment system 618 can also include instructions for generating an offline boarding code (code generation module 622).

Furthermore, offline payment system 618 includes instructions for incorporating local travel history with the offline boarding code (code generation module 622). Offline payment system 618 can also include instructions for determining one or more discounts, if applicable, based on the offline boarding code (calculation module 624). Moreover, offline payment system 618 includes instructions for calculating a charging amount based on a fare associated with the offline boarding code and the one or more discounts (charging module 626). Offline payment system 618 also includes instructions for storing the charging amount as a bill and asynchronously resolving the bill with the payment server (payment module 628).

Offline payment system 618 may further include instructions for sending and receiving messages (communication module 630). In addition, offline payment system 618 may include instructions for encrypting the messages (communication module 630). Data 636 can include any data that can facilitate the operations of offline payment system 618.

Figure 7:
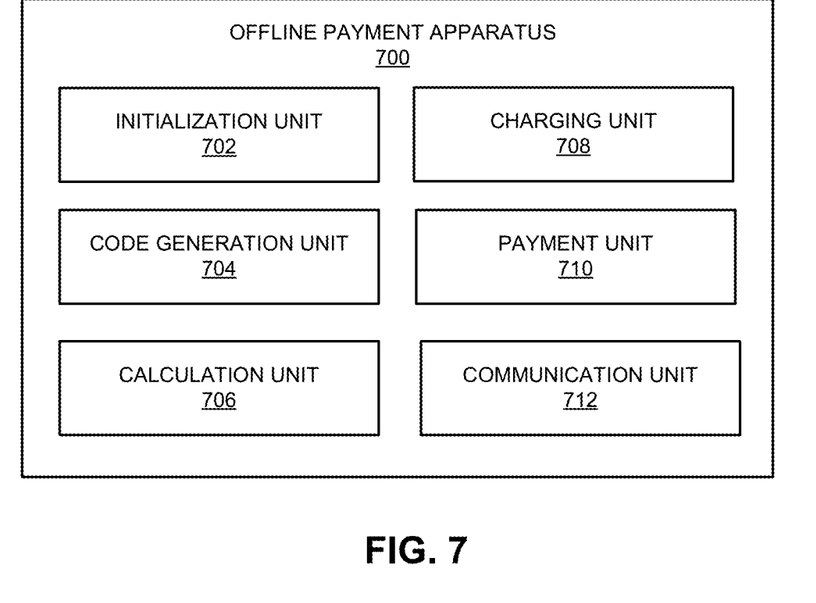
FIG. 7 illustrates an exemplary apparatus that facilitates an enhanced offline payment, in accordance with an embodiment of the present application.

FIG. 7 illustrates an exemplary apparatus that facilitates an enhanced offline payment, in accordance with an embodiment of the present application. Offline payment apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can include units 702-712, which perform functions or operations similar to modules 620-630 of computer system 600 of FIG. 6, including: an initialization unit 702; a code generation unit 704; a calculation unit 706; a charging unit 708; a payment unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating enhanced offline payment, comprising:
    obtaining, by a client system, a location indicator from a charging system, wherein the location indicator indicates a location of a current phase of an instance of a service provided to the client system, and wherein the charging system facilitates payment for the service at the location;
    generating, by the client system, an offline code that allows access to the service and usable at the location indicated by the location indicator, wherein the offline code is in a format readable by the charging system, and wherein the client system and the charging system are both offline;
    encoding, by the client system, historical data related to the current phase of the instance of the service in a field of the offline code, wherein the historical data indicates one or more previous phases of the instance of the service; and
    sending, by the client system, a message comprising the offline code to the charging system thereby allowing the charging system to determine offline payment for the current phase of the instance of the service based on the historical data.

2. The method of claim 1, wherein the current phase of the instance of the service includes a ride on a transport, and the offline code indicates a fare for the ride.

3. The method of claim 2, wherein the historical data indicates a travel history corresponding to the one or more previous phases of a journey associated with the instance of the service.

4. The method of claim 1, further comprising:

determining whether the client system is capable of generating the offline code usable at the location indicated by the location indicator; and in response to the client system being incapable, obtaining one or more pieces of data that facilitates capability for generating the offline code corresponding to the location indicator to the client system.

5. The method of claim 1, further comprising storing code data in a local storage device of the client system, wherein the code data facilitates capability for generating the offline code to the client system and comprises a key associated with the charging device.

6. The method of claim 5, wherein sending the message further comprises:

determining whether the key is valid; and in response to the key being valid, encrypting the offline code with the valid key and including the encrypted offline code in the message.

7. The method of claim 6, in response to the key being invalid, the method further comprises obtaining a new key from a key management server.

8. The method of claim 1, further comprising operating the client system based on host card emulation (HCE).

9. The method of claim 1, wherein the message is based on a short-range communication protocol that does not require scanning the offline code.

10. The method of claim 1, further comprising:

receiving updated historical data from the charging system, wherein the updated historical data further indicates the current previous phase of the instance of the service; and storing the updated historical data in a local storage device of the client system.

11. A method for facilitating enhanced offline payment, comprising:

sending, by a charging system, a location indicator to a client system, wherein the location indicator indicates a location of a current phase of an instance of a service provided to the client system, and wherein the charging system facilitates payment for the service at the location;

obtaining, by the charging system from the client system, an offline code that allows access to the service and usable at the location indicated by the location indicator, wherein the offline code is in a format readable by the charging system, and wherein the client system and the charging system are both offline;

obtaining, by the charging system, historical data related to the current phase of the instance of the service from a field of the offline code, wherein the historical data indicates one or more previous phases of the instance of the service;

determining, by the charging system, a charging amount for the current phase of the instance of the service based on the historical data; and sending, by the charging system, a message comprising an acknowledgment for the offline code to the client system.

12. The method of claim 11, wherein the current phase of the instance of the service includes a ride on a transport, and the offline code indicates a fare for the ride.

13. The method of claim 12, wherein the historical data a travel history corresponding to the one or more previous phases of a journey associated with the instance of the service.

14. The method of claim 11, wherein determining the charging amount further comprises:

determining a fare for the instance of the service at the location indicated by the location indicator and a discount amount based on the historical data; and determining the charging amount for the current phase of the instance of the service by deducting the discount amount from the fare.

15. The method of claim 11, wherein obtaining the offline code further comprises:

obtaining encrypted data from a notification message; and decrypting the encrypted data based on a key associated with the charging system.

16. The method of claim 11, further comprising:

determining validity of the offline code based on the location indicator; and in response to the offline code being valid, granting access to the current phase of the instance of the service.

17. The method of claim 11, further comprising:

storing the charging amount as a bill; and asynchronously resolving the bill with a billing server.

18. The method of claim 11, wherein the charging system operates on a point of sale (POS) system.

19. The method of claim 11, wherein the message is based on a short-range communication protocol that does not require scanning the offline code.

20. The method of claim 11, further comprising:

updating the travel data to incorporate the current phase of the instance of the service; and sending the updated travel data to the client system.

* * * * *